US006882768B2

United States Patent
Haas et al.

(10) Patent No.: US 6,882,768 B2
(45) Date of Patent: Apr. 19, 2005

(54) OPTICAL SPACER SWITCH AND INSERTION HEAD, AUTOMATIC INSERTION MACHINE AND METHOD FOR INSERTING COMPONENTS ON SUBSTRATES BY USING THE OPTICAL SPACER SWITCH

(75) Inventors: Gerhard Haas, Oberschleissheim (DE); Anton Schick, Velden (DE)

(73) Assignee: Siemens Aktiengesellschaft, Munich (DE)

( * ) Notice: Subject to any disclaimer, the term of this patent is extended or adjusted under 35 U.S.C. 154(b) by 244 days.

(21) Appl. No.: 10/242,444

(22) Filed: Sep. 13, 2002

(65) Prior Publication Data

US 2003/0068116 A1 Apr. 10, 2003

(30) Foreign Application Priority Data

Sep. 13, 2001 (DE) .......................... 101 45 167

(51) Int. Cl.[7] .............................................. G02B 6/36
(52) U.S. Cl. .............................. 385/16; 385/15; 385/27; 385/28; 385/52; 385/17
(58) Field of Search ............................ 385/16, 15, 27, 385/28, 52, 17

(56) References Cited

U.S. PATENT DOCUMENTS

| | | | |
|---|---|---|---|
| 5,084,959 A | | 2/1992 | Ando et al. |
| 5,237,639 A | * | 8/1993 | Kato et al. ................... 385/131 |
| 5,285,946 A | | 2/1994 | Tomigashi et al. |
| 5,785,651 A | | 7/1998 | Kuhn et al. |
| 5,887,009 A | | 3/1999 | Mandella et al. |
| 6,364,539 B1 | * | 4/2002 | Shahid ......................... 385/83 |
| 6,663,560 B1 | * | 12/2003 | MacAulay et al. .......... 600/160 |
| 2001/0055462 A1 | * | 12/2001 | Seibel ......................... 385/147 |
| 2002/0191268 A1 | * | 12/2002 | Seeser et al. ............... 359/260 |
| 2003/0190112 A1 | * | 10/2003 | Doerr et al. ................... 385/17 |

FOREIGN PATENT DOCUMENTS

| | | |
|---|---|---|
| DE | 196 08 468 A1 | 9/1997 |
| JP | 3-11-896 | 5/1991 |
| WO | WO 01/37025 A1 | 5/2001 |

* cited by examiner

*Primary Examiner*—Michael G. Lee
*Assistant Examiner*—Allyson N Trail
(74) *Attorney, Agent, or Firm*—Harness, Dickey & Pierce, P.L.C.

(57) ABSTRACT

A confocal spacer switch for a fast, non-contacting determination of the spacing includes a point-shaped element that simultaneously transmits and receives light, imaging optics that form an image of the light-emitting element on a switching range and a light detection device that is coupled to the light-receiving element and emits a signal if an at least partially reflecting object enters the switching range and reflected light falls onto on the light-receiving element. The light-emitting and the light-receiving element preferably is realized with an optical waveguide end. As a result, the optical spacer switch can be divided into two modules that are connected via the optical waveguide, wherein a purely optical module can be realized in a compact and lightweight manner. A method for inserting components on substrates, uses the spacer switch, for which the insertion speed of the components is reduced immediately prior to inserting them. Thus, the impact of the component with the substrate is reduced, for an on the whole fast insertion operation.

29 Claims, 2 Drawing Sheets

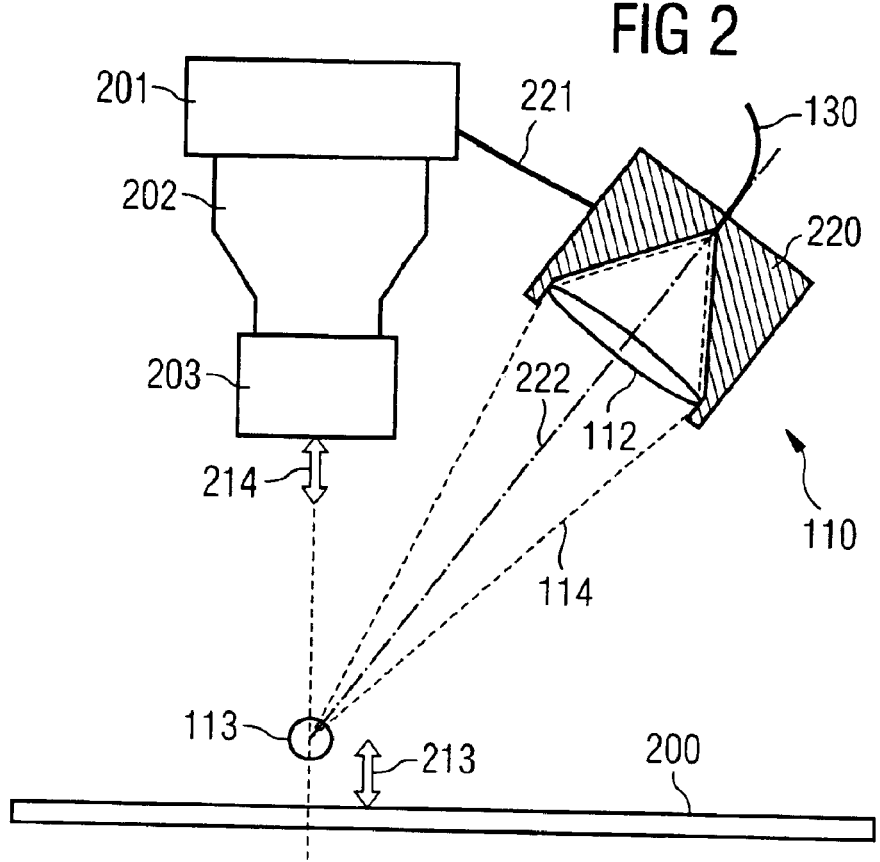
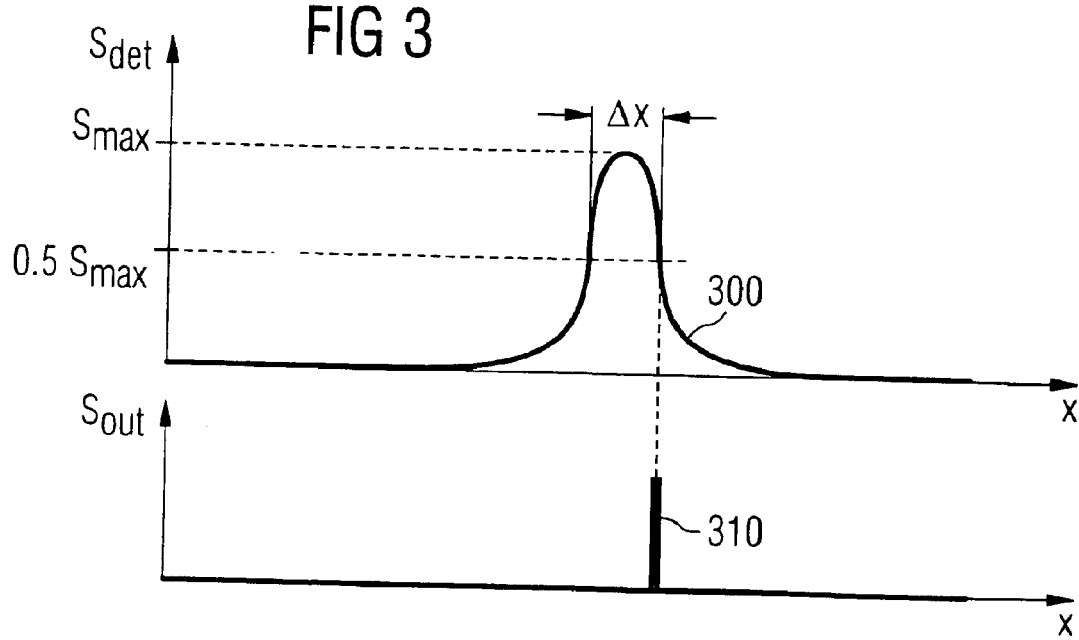

OPTICAL SPACER SWITCH AND INSERTION HEAD, AUTOMATIC INSERTION MACHINE AND METHOD FOR INSERTING COMPONENTS ON SUBSTRATES BY USING THE OPTICAL SPACER SWITCH

The present application hereby claims priority under 35 U.S.C. §119 on German patent publication number DE 10145167.9 filed Sep. 13, 2001, the entire contents of which are hereby incorporated herein by reference.

FIELD OF THE INVENTION

The invention generally relates to an optical spacer switch for the fast and non-contacting determination of spacing. Preferably, this is based on the confocal imaging (image-forming) principle as well. The invention further generally relates to an insertion head and an automatic insertion machine for inserting components on substrates by using the optical spacer switch. The invention furthermore generally relates to a method for inserting components on substrates by using the optical spacer switch.

BACKGROUND OF THE INVENTION

For the automatic insertion of components on circuit boards, the components are withdrawn from a pick-up location on a component feeding device by using a gripping device and are transported to the component insertion location on the circuit board.

The term component in the following is understood to mean all elements that can be assembled, in particular electronic components, electromechanical components, plugs and plug connections for electrical and mechanical contacts, as well as shields made of sheet metal. Elements for insertion furthermore are bare dies or individual parts of a semiconductor wafer that are further processed into complete components following the structuring and cutting of the wafer.

Suction pipettes arranged on an insertion head, in particular, can be used as gripping devices and can be connected to a vacuum system. With the aid of these suction pipettes, the components for insertion can be picked up without interruption from the component feeding device, can be transported reliably to the desired insertion location and can be released there at an exactly defined placement location. To achieve the highest possible insertion rate with modern automatic insertion machines, the pickup of components from the component feeding device, the transport and the insertion of these components on the substrates must occur as quickly as possible. At the same time, however, damage to the component, the gripping device and the substrate is to be avoided at all cost.

The components for insertion, which are suspended vertically from the top by the suction pipettes, can be damaged, for example, through a high impact when they are place with excessive speed onto the substrates. In particular since the substrate position can diverge significantly, for example through bulging, corresponding measures must be taken to prevent the gripping device and the component for insertion from hitting the substrate with excessive speed.

For this, the U.S. Pat. No. 5,285,946 discloses a device for placing electronic components onto the surfaces of circuit boards. With this device, a suction pipette tip that functions as gripping device is positioned with spring force. The spring force ensures that the necessary contact pressure is reached when the component is placed onto the substrate or when the suction pipette is attached to the component in a component-feeding device, without destroying the component as a result of excessive pressure or an excessive impact. This solution increases the susceptibility of the gripper as well as its mass and reduces the positioning accuracy that can be achieved.

Another known option for avoiding damage to the components to be inserted and, at the same time, achieve a relatively high insertion capacity is to move the components at a slower speed just prior to the insertion, following an initially high transport movement, so that the impact between the component and the substrate is not excessive. A high insertion capacity at the cost of a higher error rate is achieved by maintaining a fast transport movement until just prior to reaching the substrate for insertion. A low probability of insertion errors is achieved by reducing the fast transport speed early enough so that an excessively hard impact of the component during the insertion can reliably be avoided. Thus, the automatic insertion of components always requires a compromise between the highest possible insertion speed on the one hand and the lowest possible insertion error rate caused by excessive impact.

SUMMARY OF THE INVENTION

An object of an embodiment of the invention is to create a compact and lightweight spacer switch for effecting a quick distance determination, an insertion head, as well as an automatic insertion machine, designed to permit a high insertion of components on substrates with a simultaneously low failure rate. It is furthermore an object of an embodiment of the invention to create a method for inserting components onto substrates which makes it possible to have a low failure rate due to damaged components, damaged gripping devices and/or damaged substrates along with a high insertion rate.

An optical spacer switch, based on the confocal imaging principle, is based on the idea that a confocal optical spacer sensor can be redesigned through a rough simplification of the sensor configuration to function as optical spacer switch or optical proximity switch. An optical spacer switch can be used advantageously in all cases where an object to be detected, which at least partially reflects or scatters back light, enters the switching range, which is also spatially stationary relative to a stationary spacer switch, or if the optical spacer switch together with the switching range is moved relative to an object and if a signal is emitted because a specific distance between object and spacer switch is not reached or is exceeded. The optical spacer switch according to an embodiment of the invention, which operates non-contacting, has the advantage that even a slanted view of the measuring location does not lead to a measuring error and that a minimum sensitivity exists toward scattered-back or reflected light as a result of the extremely small sensing field or switching range.

The course of the light intensity, which is reflected or scattered back to the light-receiving element by an object entering the switching range, may initially be described qualitatively. For this, it must be assumed that the object to be detected is initially far outside of the switching range. In that case, the intensity of the light scattered back to the light-receiving element is very low. During the approach of the object to the switching range, the intensity that is reflected back and imaged on the light-receiving element increases. This intensity reaches a maximum if the surface of the object to be examined is located exactly in the central region of the switching range. During a further approach of the object to be detected to the optical spacer switch, the object surface that scatters back the light initially leaves the central region of the switching range and subsequently the complete switching range and the intensity detected by the light-receiving element consequently decreases once more. This results in the ability to determine precisely when a switching signal is emitted, meaning at which distance between the optical switch and the object triggering the switching operation. Accordingly, the signal is triggered precisely at the point in time where the course of the scattered back light intensity falls below a specific threshold value after exceeding a maximum intensity value.

It is particularly advantageous if the threshold value is a specific fraction of the previously determined maximum intensity value. The advantage of this is that in particular with strong noise interference of the detector signals, the probability of an undesirable erroneous triggering of the signal can be reduced considerably.

The imaging optics of the optical spacer switch can include a converging lens. The complete imaging optics of a particularly simple form is realized completely with a single converging lens. The size of the switching range, determined by the focal depth and the focal width, can be computed easily. From an elementary optical view, it follows that the depth of focus of the optical spacer switch is inversely proportional to the square of the numerical aperture NA of the lens. Thus, a numerical aperture NA of 0.12 has a depth resolution of approximately 30 $\mu$m. The switching accuracy, meaning the accuracy at which the output signal is emitted with respect to the distance between the optical switch and an object triggering the switching operation, is approximately 10 times higher than the depth of focus.

According to a particularly preferred embodiment of the invention, the light-emitting element and the light-receiving element of the optical spacer switch are realized by use of a first end section of an optical waveguide. This optical waveguide may be a mono-mode waveguide. Thus, without using pinhole diaphragms, the optically active surface of the light-emitting as well as the light-receiving element can be kept small and a nearly point-shaped light-emitting and light-receiving element can easily be realized. The use of a mono-mode optical waveguide furthermore has the advantage that higher-mode light, which is fed into the optical waveguide, is decoupled while the light passes through the mono-mode waveguide, particularly at the waveguide bends. Thus, it is ensured that the light-emitting element only emits light in the transverse basic mode.

In accordance with a different, preferred embodiment of the invention, a second end section of the waveguide is optically coupled to a light source as well as a light detector in the light-detection device. The advantage of this is that the optical spacer switch can be divided into two spatially divided modules, wherein the two modules are optically coupled via the waveguide. A first purely optical module in this case contains the first end of the optical waveguide and the imaging optics. The second electro-optical module comprises a light source, a light detector, the second end of the optical waveguide and the light-detection device. The spatial separation of the two modules, in particular, has the advantage that the purely optical module can be realized compact and lightweight. As a result, the optical spacer switch can also be used at sensing locations, which until now were unsuitable for the detection with conventional spacer sensors, owing to their inaccessibility and/or because of fast movements of the measuring location.

A first partial end of the second end of the second optical waveguide end may be coupled optically to the light source and a second partial end is coupled optically to the light detector. This is preferably achieved by splitting the second waveguide end by means of an optical three-way waveguide coupler and by optically coupling the resulting partial ends with the light detector or the light source.

The light source for an embodiment of the invention is a laser, for example a semiconductor laser, or a light-emitting diode. However, the types of light sources that can be used are not limited to the explicitly mentioned light sources. A gas discharge lamp, a halogen lamp, a normal light bulb with filament or even a fluorescent lamp can also be used as light source. If necessary, the spatial expansion of the light-emitting element resulting from the light source used must be reduced with a suitable pinhole diaphragm. In all cases, the wavelength of the emitted light can be in the infrared, the visible or the ultraviolet spectral range.

According to another embodiment of the invention, the optical spacer switch can also be used to monitor two or more independent switching ranges. This may be achieved by using at least one additional point-shaped, light-emitting and light-receiving element. An image of this element is formed by the imaging optics on an additional switching range that is predetermined by the image-forming characteristics of the imaging optics. By using an additional light-detection device, which is coupled to the additional light-receiving element, the additional switching range can be monitored. The relative position of the two switching ranges is then determined by the imaging characteristics of the imaging optics and the spatial position of the light-emitting element and the additional light-emitting element.

An object with respect to the device may be furthermore solved with an insertion head and an automatic insertion machine.

The insertion head for transporting components from a pickup location to an insertion location is provided with a gripping device and an optical spacer switch, as described in the above. When retrieving components, the gripping device, which may be a suction pipette, is moved relative to the pickup location and/or for the insertion of components relative to the insertion location. The optical spacer switch is arranged in a fixed spatial position, at least during the course of an insertion operation and relative to the gripping device. The spacer switch is furthermore aligned such that during the movement of the gripping device, the pickup location or the insertion location enters the switching range and an output signal is accordingly emitted by the light-detection device. The fixed spatial arrangement of the spacer switch on the moving gripping device has the advantage that during the insertion of components with differing spatial dimensions onto the substrates and/or during a variation of the actual substrate position from the desired substrate position, optical parallax errors can be avoided as a result of the confocal spacer switch. Parallax errors can occur, for example, if a conventional optical sensor detects the switching range at a slanted angle.

With the insertion head, the light-detection device is coupled with a control device for controlling the movement course of the gripping device. This opens up the possibility that the gripping device movement speed can be changed when the pickup location or the insertion location enter the switching range. In particular when inserting a component onto a substrate, the movement speed of the gripping device can be reduced immediately prior to the component making contact with the substrate. As a result, the failure rate, meaning the erroneous insertion as a result of damaged components and/or a damaged gripping device can be minimized, even if most of the component transport movement for maximizing the insertion capacity occurs at a high speed.

An object of an embodiment of the invention relating to the method may be solved with a method for inserting components on substrates.

The method can be used not only for inserting components onto a substrate, but also during the pick-up of components to further increase the insertion capacity of an automatic insertion machine.

BRIEF DESCRIPTION OF THE DRAWINGS

Additional advantages and features of the present invention are described in the following with the example of the presently preferred embodiment. Shown in the drawing are:

FIG. 2 The additional installation of an optical spacer switch on a gripping device.

FIG. 3 The qualitative course of the light intensity scattered back by an object to be detected and the resulting output signal.

DETAILED DESCRIPTION OF THE PREFERRED EMBODIMENTS

Figure 1:
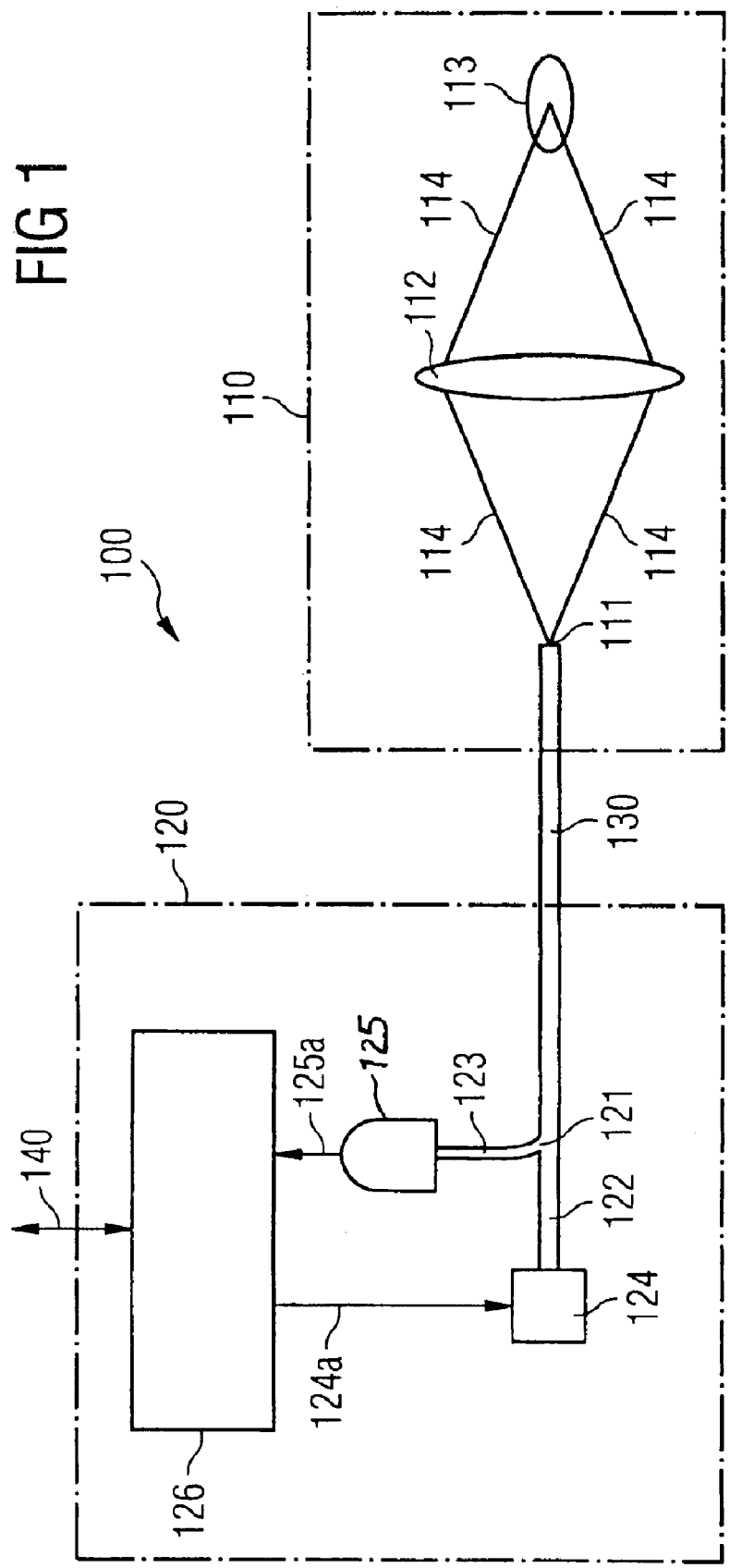
FIG. 1 The schematic design of an optical spacer switch according to an exemplary embodiment of the invention.

FIG. 1 shows that an optical spacer switch 100 is divided into two spatially separate modules, an optical module 110 and an electro-optical module 120. The two spatially separated modules are connected via an optical waveguide 130, preferably a so-called mono-mode optical waveguide. The optical module 110 has a fiber end 111 that simultaneously functions as nearly point-shaped light-emitting element and as nearly point-shaped light-receiving element. An image of the light emitted by the fiber end 111 is formed by the imaging optics 112 on a switching range 113. The edge rays of the respective light bundle are given the reference number 114 in FIG. 1. For the electro-optical module 120, the other fiber end of the optical waveguide 130 is split into two partial ends, a first partial end 122 and a second partial end 123. The division according to the embodiment in FIG. 1 occurs with a three-way optical waveguide coupler 121. The first partial end 122 of the optical waveguide 130 is coupled to a light source 124, for example a laser diode. The second partial end 123 of the optical waveguide 130 is optically coupled with a light detector 125, for example a photodiode. The light source 124 is connected via the control line 124a and the light detector 125 is connected via the detector line 125a to an electronics module 126. The electronics module 126 is designed to control the light intensity emitted by the light source 124 and to supply the detector 125 with supply voltage as well as to detect the signal emitted by the detector. The electronics module 126 according to the exemplary embodiment shown herein is provided with an interface 140, so that the optical spacer switch 100 can be coupled with additional modules, for example a microprocessor.

The optical spacer switch 100 is explained in further detail in the following. An image of the light bundle 114, emitted by the fiber end 111, is formed onto the switching range 113 by the imaging optics 112, which is a simple biconvex lens or even better a bi-aspheric lens for this embodiment. The spatial dimensions of the switching range 113 in this case are determined by the focal depth and focal width of the optical imaging realized with the lens 112. If an at least partially reflected or light-scattering object moves from the outside into the switching range 113, an image of the light intensity that is reflected back or scattered back by the imaging optics 112 is formed onto the fiber end 111. The light intensity hitting the fiber end 111 thus increases if an object is approaching the switching range 113 and reaches a maximum if the surface of the object to be detected just reaches the central area of the switching range 113. With a further approach of the object to be detected to the imaging optics 112, the intensity of the light scattered back onto the fiber end 111 decreases again. An output signal can be generated from the course of the scattered back light intensity that is detected by the light detector 125 and is transmitted as electronic detector signal to the electronics module 126. This output signal is emitted for a specific distance between the object to be detected and the optical spacer switch 100 or the imaging optics 112. The determination of the output signal from the scattered back light intensity that is detected by the light detector 125 occurs in the electronic module 126. Alternatively, the course of the scattered back light intensity can also be evaluated by a processor, not shown herein, which is coupled via the interface 140 to the electronic module 126.

FIG. 2 shows the use of an optical spacer switch for the automatic insertion of components on a substrate 200. Components of the optical spacer switch, which were explained previously with the aid of FIG. 1, were given the same reference numbers in FIG. 2 and will not be explained further in the following. FIG. 2 shows that the optical module 110, which is coupled via an optical waveguide 130 to an electro-optical module, not shown herein, of the optical spacer switch 100, is coupled by means of a rigid connection 221 to a holder 201. This holder 201, which belongs to an insertion head, for example a revolving head, can be moved relative to the insertion head, such that the gripping device 202, a suction pipette according to the embodiment shown herein, can be moved relative to the substrate 200. A component 203 that is held by the gripping device 202 can thus be placed onto the substrate 200. With a movement of the holder 201 in vertical direction, the component 203 and the switching range 113 are also moved. The spatial positioning of the switching range is determined by the optical axis 222 and the edge rays 114 of the optical module 110. The movement course of the component 203 is indicated with double arrow 214 and the movement course of the switching range 113 is indicated with double arrow 213. The stable spatial position of the optical axis 222, relative to the holder 201, is determined by the rigid connection 221 as well as the housing 220. The housing keeps the imaging optics 112 in a defined spatial position relative to the fiber end of the optical waveguide 130 and the holder 201.

The optical module 110 of the optical spacer switch is adjusted in such a way that the electro-optical module 120 indicates whether a specific distance between the gripping device 202 and the surface of the substrate 200 for insertion is not reached or is exceeded by emitting a triggering signal. During the adjustment of the optical spacer switch 100, the switching range 113 is oriented such that with the gripping device 202 in the raised position, it is removed far enough from the surface of the substrate for insertion that the optical spacer switch 100 does not emit a signal. Once the gripping device 202 is lowered and the pre-adjusted switching distance between substrate 200 and component 203 or between the gripping device 202 and a component in the pickup position is reached, a signal is transmitted to a control device (not shown) for the gripping device 202. This signal is used to correct the movement course of the gripping device 202 in such a way that the component 203 is placed with reduced speed onto the substrate 200. During the insertion of the component 203 on the substrate 200, a second sensor that is not shown herein indicates the mechanical contact with the substrate surface and the movement of the gripping device 202 is stopped. This ensures a minimum impulse for the impact between the component 203 and the substrate 200, despite an on the whole high insertion capacity, thus also minimizing the error probability of the insertion process due to a damaged substrate, a damaged component and/or a damaged gripping device.

FIG. 3 shows the course 300 for the detector signal $S_{det}$ if an object to be detected enters the switching range 113 or if the optical spacer switch 100 is moved in the direction of a surface, particularly a substrate 200 surface. During the movement of the optical spacer switch in the direction of the substrate surface, the measured detector signal $S_{det}$ will increase as soon as the substrate 200 enters the switching range 113. The maximum for the detector intensity $S_{max}$ is determined with a digital "sample and hold" method. Following the maximum value, the output signal is emitted at the point where the intensity has dropped to exactly half. Additionally using a triggering threshold, which is at least slightly above the noise level, ensures that fluctuations in the output signal of the detector 125, for example caused by noise, do not lead to an accidental triggering of the output signal. The fact that the point in time for emitting the output signal is independent of the driving movement, meaning independent of the speed and acceleration of the optical spacer switch 100, represents another advantage. The full width at half maximum Δx of the detector signal $S_{det}$ is inversely proportional to the square of the numerical aperture NA of the imaging optics used.

In summary, the invention creates a confocal optical spacer switch 100 for a quick, non-contacting distance determination, comprising a point-shaped element that simultaneously emits light and receives light, an imaging optics 112 that images the light-emitting element on a switching range 113 which is predetermined by the imaging characteristics of the imaging optics, and a light detection device that is coupled to a light-receiving element and emits a signal 310 if an at least partially reflecting or light scattering object moves into the switching range 113 and reflected or scattered light hits the light-receiving element. The light-emitting and light-receiving element preferably is realized with an optical waveguide end 111. Thus, the optical spacer switch 100 can be divided into two separate modules that are connected via the optical waveguide 130, wherein a compact, lightweight and purely optical module 110 can be realized. The invention furthermore creates a method for inserting components 203 on a substrate 200 by using the spacer switch 100, wherein the insertion speed for the components 203 is reduced just prior to the insertion and thus, with an on the whole fast insertion movement, the impact between the component 203 and the substrate 200 or the impact between the gripping device 202 and the component 203 is reduced to non-critical values.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical switch for a fast, non-contacting determination of spacing, based on a confocal imaging principle, said switch comprising:
   a nearly point-shaped light-emitting element;
   imaging optics, adapted to image the light-emitting element onto a switching range that is predetermined by an image-forming characteristics of the imaging optics;
   a nearly point-shaped light-receiving element, arranged at a same location as the light-emitting element or arranged confocal to the light-emitting element; and
   a light detection device, coupled to the light-receiving element,
   wherein the light detection device is designed such that a signal is emitted if an object moves into the switching range and the light from the light-emitting element that impinges via the imaging optics onto the object is scattered back at least in part and an image of the scattered-back light is formed by the imaging optics on the light-receiving element.

2. A spacer switch according to claim 1, wherein the imaging optics is provided with a converging lens.

3. A spacer switch according to claim 1, further comprising:
   at least one additional, nearly point-shaped light-emitting element, imaged by the imaging optics on an additional switching range that is predetermined by the imaging characteristics of the imaging optics;
   at least one additional, nearly point-shaped light-receiving element that is arranged at the same location as the additional light-emitting element or confocal to the additional light-emitting element; and
   an additional light-detection device that is coupled with the additional light-receiving element, wherein the additional light-detection device is designed such that an additional signal is emitted if an object moves into the additional switching range and if light from the additional, light-emitting element falls onto the object via the imaging optics and is at least partially scattered back and if the scattered-back light is imaged by the imaging optics on the additional light-receiving element.

4. An insertion head for transporting components from a pickup location to an insertion location, comprising:
   a gripping device, which is at least one of moved relative to the pickup location during the pickup of the components, and moved relative to the insertion location during the insertion of components;
   an optical spacer switch according to claim 1, arranged relative to the gripping device in a fixed spatial position, at least during the course of an insertion operation,
   wherein the spacer switch is aligned such that during the movement of the gripping device, at least one of the pickup location and the insertion location enters the switching range.

5. An automatic insertion machine for the insertion of components on substrates by using an insertion head according to claim 4.

6. An insertion head according to claim 4, wherein the light detection device is coupled to a control device that controls the movement of the gripping device, such that the movement speed of the pickup location or the insertion location entering the switching range can be changed.

7. An automatic insertion machine for the insertion of components on substrates by using an insertion head according to claim 6.

8. A spacer switch according to claim 1, wherein the light detection device is designed such that once a maximum intensity value is exceeded, the signal is emitted if the course of the intensity of the light, which is scattered back by the object onto the light-receiving element, falls below a relative intensity value.

9. A spacer switch according to claim 8, wherein the relative intensity value is predetermined, or determined by the maximum intensity value.

10. A spacer switch according to claim 8, wherein the relative intensity value is determined by the maximum intensity value.

11. A spacer switch according to claim 8, wherein the imaging optics is provided with a converging lens.

12. A spacer switch according to claim 8, wherein the light-emitting element is realized with a first end of an optical waveguide.

13. A method for inserting components onto substrates, comprising:
   moving a component held by a gripping device, relative to an insertion location;
   having the insertion location enter the switching range of an optical spacer switch according to claim 1;
   transmitting a signal, triggered when the insertion location enters the switching range, to a control device for controlling the gripping device movement; and
   changing the movement speed of the gripping device.

14. A method according to claim 13, wherein at least one of the following occurs:
   the component that is held by the gripping device is moved in the direction of the insertion location and
   the gripping device without a component is moved in the direction of the pickup location.

15. A method according to claim 13, wherein the speed of movement for the gripping device is reduced.

16. A method according to claim 13, wherein the signal is triggered after passing a maximum intensity value if the course of the light intensity that is scattered back by the insertion location or the pickup location onto the light-receiving element falls below a relative or absolute intensity value that is predetermined or is determined by the maximum intensity value.

17. A method according to claim 13, wherein the speed of movement for the gripping device is reduced.

18. A spacer switch according to claim 1, wherein the light-emitting element is realized with a first end of an optical waveguide.

19. A spacer switch according to claim 18, wherein the optical waveguide is a mono-mode optical waveguide.

20. A spacer switch according to claim 19, wherein a second end of the optical waveguide is optically connected to a light source as well as a light detector of the light detection device.

21. A spacer switch according to claim 18, wherein a second end of the optical waveguide is optically connected to a light source as well as a light detector of the light detection device.

22. A spacer switch according to claim 21, wherein the second end of the optical waveguide is divided into two partial ends, wherein a first partial end is optically coupled to the light source and a second partial end is optically coupled to the light detector.

23. A spacer switch according to claim 21, wherein the light source and the light detector are optically coupled with the second end of the optical waveguide by use of a fiber-coupling device provided with a beam divider.

24. A spacer switch according to claim 21, wherein the light source is a laser or a light-emitting diode.

25. A spacer switch according to claim 21, wherein the light detector is at least one of a secondary electron multiplier, a photodiode and an avalanche photodiode.

26. A method for inserting components onto substrates, comprising:
   moving a gripping device that does not hold a component, relative to a pickup location;
   having the pickup location enter at least one of the switching range and an additional switching range of an optical spacer switch in accordance with claim 25;
   triggering a signal when the pickup location enters the switching range, which signal is transmitted to a control device for controlling the movement of the gripping device; and
   changing the movement speed of the gripping device.

27. A method according to claim 26, wherein at least one of the following occurs:
   the component that is held by the gripping device is moved in the direction of the insertion location and
   the gripping device without a component is moved in the direction of the pickup location.

28. An optical switch comprising:
   a nearly point-shaped light-emitting element;
   imaging optics, adapted to image the light-emitting element onto a predetermined switching range;
   a nearly point-shaped light-receiving element; and
   a light detection device, coupled to the light receiving element,
   wherein a signal is emitted if an object moves into the switching range and the light from the light-emitting element that impinges via the imaging optics onto the object, is scattered back at least in part, and wherein an image of the scattered-back light is formed by the imaging optics on the light-receiving element.

29. An insertion head for transporting components from a pickup location to an insertion location, comprising:
   a gripping device, adapted to move relative to the pickup location and, during the insertion of components, is adapted to move relative to the insertion location; and
   an optical spacer switch, arranged relative to the gripping device in a fixed spatial position at least during the course of an insertion operation, the switch including,
      a nearly point-shaped light-emitting element;
      imaging optics, adapted to image the light-emitting element onto a predetermined switching range;
      a nearly point-shaped light-receiving element; and
      a light detection device, coupled to the light-receiving element, wherein a signal is emitted if an object moves into the switching range and the light from the light-emitting element that impinges via the imaging optics onto the object, is scattered back at least in part, and wherein an image of the scattered-back light is formed by the imaging optics on the light-receiving element, and wherein the spacer switch is aligned such that during the movement of the gripping device, at least one of the pickup location and the insertion location enters the switching range.

* * * * *